Oct. 28, 1930.  R. C. ANGELL  1,779,997
LIGHT PROJECTOR
Original Filed May 24, 1926   2 Sheets-Sheet 1
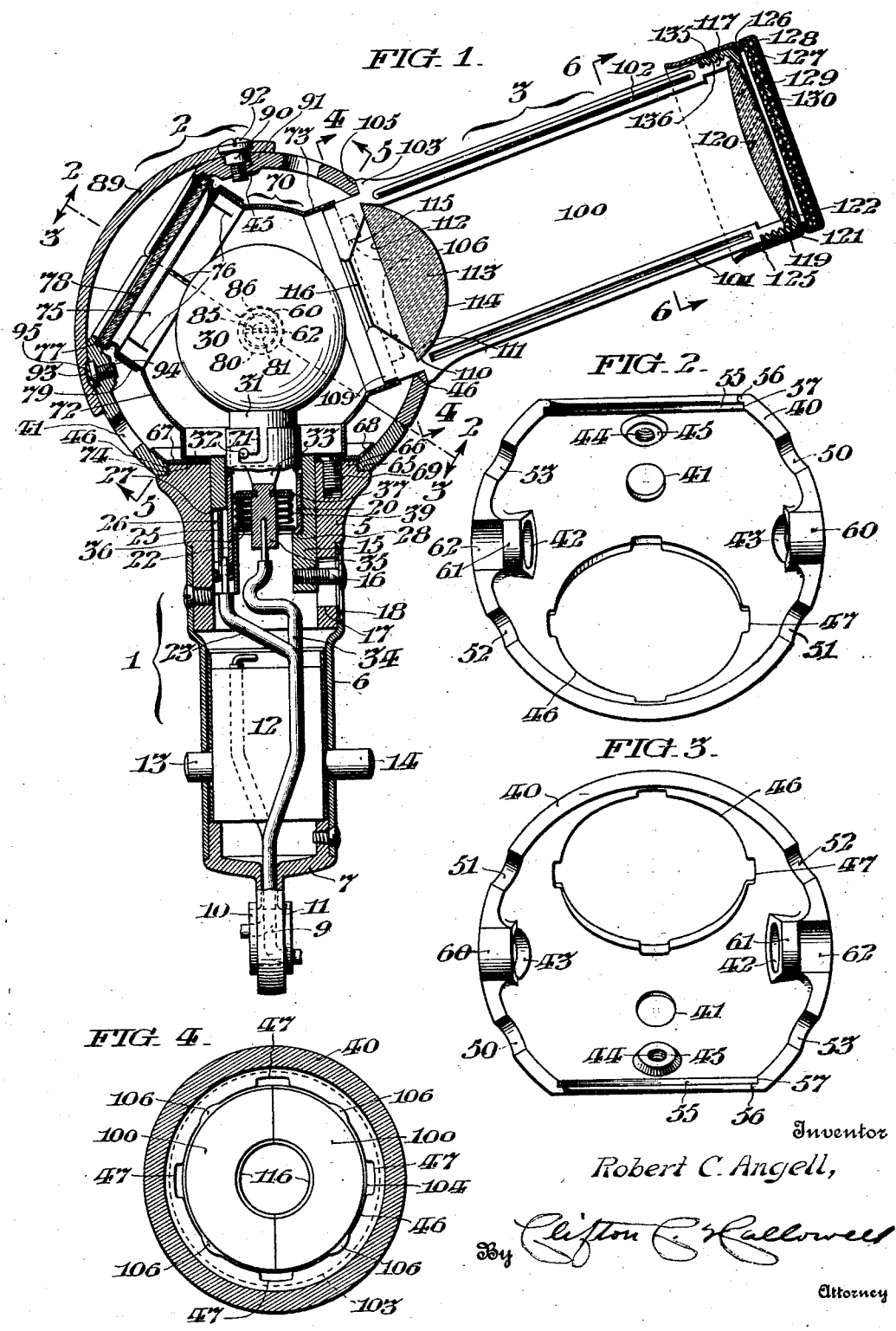
Inventor
Robert C. Angell,
By Clifton C. Hallowell
Attorney Oct. 28, 1930. R. C. ANGELL 1,779,997
LIGHT PROJECTOR
Original Filed May 24, 1926 2 Sheets-Sheet 2
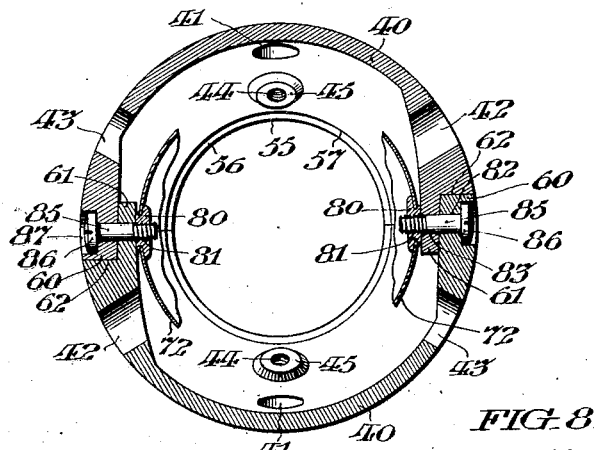
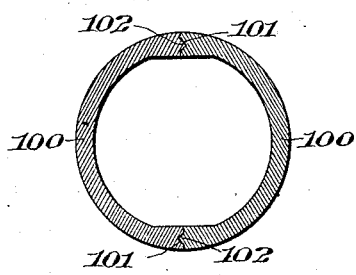
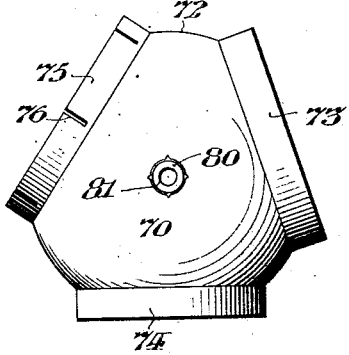
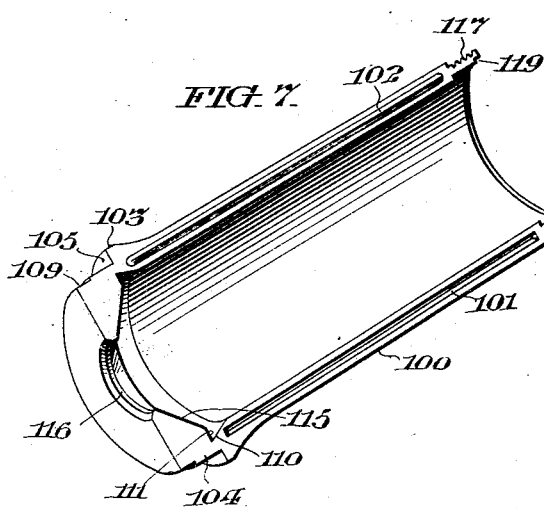
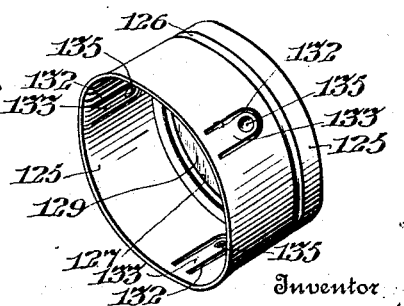
Inventor
Robert C. Angell,
By Clifton C. Hallowell
Attorney Patented Oct. 28, 1930

1,779,997

UNITED STATES PATENT OFFICE

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA

LIGHT PROJECTOR

Application filed May 24, 1926, Serial No. 111,167. Renewed May 23, 1930.

My invention relates particularly to light projectors that are adapted for the use of professional operators, such as dentists, surgeons, or technicians, and is especially directed to that class of such devices as are designed to project an intensified pencil ray and to localize the illumination upon a region to be inspected or operated upon.

The principal objects of my invention are to provide a light projector that may be economically formed and readily assembled, and that may be conveniently utilized without danger of unduly heating, and consequently be safely and comfortably handled.

Other objects of my invention are to provide a light projector provided with a conveniently disposed auxiliary window, having an adjustable shutter, for purposes not requiring an intensified pencil ray, as, for instance, the illumination of X-ray films.

Further objects of my invention include a removable attachment, which cooperates with the light concentrating lenses for producing the intensified pencil ray, and which includes color screens for absorbing the excess color rays of the lamp bulb to produce a purely daylight ray.

My invention also includes a novel construction of lamp body and lens tube, whereby counterpart halves of the lamp-body structure and the lens-tube structure may be assembled in interlocked relation to form the composite light-projector structure.

Specifically stated, the form of my invention as hereinafter described, comprehends a light projector comprising a lamp housing formed of readily joined counterpart sections, a lens-carrying tube or barrel also formed of counterpart sections, and a lamp mounting upon which said lamp housing and lens tube are mounted for rotation about the axis of the lamp mounted on said lamp mounting, all being formed of non-heat-conducting material, and includes a heat-deflecting and light-reflecting shield embracing said lamp and concentrically spaced from the housing wall to afford ample space for the circulation of air between said housing wall and said shield, a window for illuminating photographic films and having a controlling shutter, and a removable cap for the lens tube having color screens cooperative with the lenses in said lens tube to direct an intensified daylight pencil ray.

My invention also includes all of the various novel features of construction and arrangement as hereinafter more definitely specified.

In the accompanying drawings, Figure 1 is a central vertical longitudinal sectional view of a light projector embodying the characteristic features of my invention; Fig. 2 is an inverted plan view of the upper section of the lamp housing as viewed toward the inclined plane indicated on the line 2—2 in Fig. 1; Fig. 3 is a plan view of the lower section of said housing as viewed on the inclined plane indicated by the line 3—3 in Fig. 1; Fig. 4 is a transverse sectional view taken in the plane indicated by the line 4—4 in Fig. 1, and showing the inner end of the lens tube or barrel; Fig. 5 is a central transverse sectional view taken through the lamp housing and light-reflecting shield on the line 5—5 in Fig. 1, only fragments of said shield being shown for convenience of illustration; Fig. 6 is a sectional view taken transversely through the lens tube or barrel on the line 6—6 in Fig. 1; Fig. 7 is a perspective view of one of the counterpart sections of the lens tube or barrel; Fig. 8 is a side elevational view of the light-reflecting and heat-deflecting shield; and Fig. 9 is a perspective view of the lens-tube cap which serves as a holder for the daylight screens.

In said figures, the light projector comprising the lamp mounting 1, lamp housing 2, and lens-carrying tube 3, is arranged to be supported by any suitable form of light bracket arm, preferably having universal joints adapted to permit the light projector to be moved into any desired position.

The lamp mounting comprising the hollow body 5, preferably formed of a synthetic gum or phenolic condensation product, is carried by the tubular extension 6 which may be formed of metal and which has the end member 7 terminating in the hollow disk 9 having the oppositely directed bosses 10 and 11 for connection with the terminal of any suitable and well known form of bracket arm.

The hollow extension 6 serves as a housing for the electrical switch 12, having the on- and-off controlling buttons 13 and 14 respectively for controlling the electrical connections comprising the lead wires leading electric current to the lamp.

Within the bore of the hollow body 5 is disposed in telescopic relation, the tubular lamp-mounting sleeve 15, which is adjustably secured therein by the screw 16 projecting through slots 17 and 18 in the hollow body 5 and in the upper enlarged portion of the hollow extension 6 respectively.

Within the lamp-mounting sleeve 15 is mounted the lamp-mounting cup 20, which is provided with oppositely disposed bayonet slots 21, and has the extension 22 to which the electrical lead wire 23 is attached. The extension 22 is connected with the spacing bar 25, which is disposed in the slot 26 in the lamp-mounting sleeve 15, and abuts against the end wall 27 of said slot to prevent the upward or outward displacement of the lamp-mounting cup 20 from its annular seat formed by the shoulder 28.

The electric lamp 30 which is of the type used for automobile illumination, has the cylindrical shank 31 provided with the oppositely disposed radially extended catch pins 32, and is mounted in the lamp-mounting cup 20 with said pins 32 engaged with the bayonet slots 21 in a well known manner, and its contact 33 engaging the contact plug or plunger 35 which is mounted for reciprocation through the fiber plate 36 forming the bottom wall of the lamp-mounting cup 20 and which is connected by the lead wire 34 through the switch 12.

Said plunger 35 is provided with a fiber disk collar 37 between which and the fiber plate 36 is disposed a spiral spring 39 encircling said plunger 35 and arranged to force it outwardly against the contact 33 of the lamp 30, but arranged to yield to permit the lamp to be engaged with the bayonet catch comprising the bayonet slots 21 and pins 32.

The lamp housing 2 is preferably formed of non-heat-conducting material such as a phenolic condensation product and comprises counterpart sections preferably in the form of semi-spherical shells 40, each comprising vent holes 41, 42 and 43, and threaded apertures 44 surrounded by internal bosses 45, and each having apertures 46, the walls of which are indented to form notches 47 in the margin of the shell 40 contiguous to said aperture 46.

The plane edges of said semi-spherical shells are each provided with the semicylindrical recesses 50, 51, 52 and 53, so disposed that when said edges are brought together in abutted relation to form the lamp-housing structure, these semicylindrical recesses will so register as to form circular vent holes similar to the vent hole 41. Said shells 40 also have their plane edges provided with deeply cut semicircular recesses 55 forming the flange 56 and rabbet 57, so that when said shells have their edges abutted to form the lamp housing, a circular opening will be provided to form a window, to be further described hereinafter.

Each of the semi-spherical shells 40 are provided with overlapping projections or lugs 60 and 61, and corresponding recesses 62 arranged to receive the lugs 60 and to guide said shells 40 into proper registry to form the spherical lamp housing 2.

The lower section of the lamp-housing structure is conveniently mounted upon the peripheral ledge 65 of the hollow body 5 with the boss 66 extended through the aperture 46 so that the housing may rotate about the axis of the hollow body 5 and lamp 30, being retained for such rotation on the hollow body 5 by the annular plate 67 having the flange 68 arranged to bear against the inner wall of the shell 40, as shown in Fig. 1; said plate 67 is secured to the hollow body 5 by screws 69 and may be adjusted by said screws to bring the flange 68 to bear with any desired frictional engagement with the inner wall of the lower shell 40 of the lamp housing.

Within the lamp housing 2, a light-reflecting and heat-deflecting shield 70 is concentrically mounted and comprises the spherical body 72 having three substantially equally spaced openings therein respectively surrounded by the cylindrical flanges 73, 74 and 75, whose axes are preferably disposed in a common plane, the latter flange being provided with longitudinally directed slits 76 extended inwardly from its outer edge so that it may be contracted to receive the cap 77, comprising the preferably ground or frosted crystal 78 and flange 79, which latter is arranged to embrace the slitted flange 75 of the shield 70, as shown in Fig. 1; said cap 77 having its outer peripheral edge seated in the rabbeted opening formed by the complementary recesses 55 in the abutted shells 40.

The light-reflecting shield 70 is provided upon its opposite sides with axially alined bushings 80 having threaded apertures 81 which are disposed in axial alinement with apertures 82 and 83 in the lugs 60 and 61 respectively, through which screws 85 extend, having their shanks extended through said apertures 82 and 83 in threaded engagement with the threaded aperture 81 in the bushing 80 of the light-reflecting shield 70, the heads 86 of said screws being disposed in countersunk recesses 87 in the outer walls of the lugs 60.

It will thus be seen that the counterpart sections comprising the shells 40 of the lamp housing 2 are integrally joined with the light-reflecting and heat-deflecting shield by said screws 85, and consequently the structure thus formed may be readily dis-assembled, for the replacement of the lamp or for the cleaning of the interior parts within the lamp housing, by the mere removal of said screws.

As shown in Fig. 1, the opening formed by the recesses 55 serves as a window, and is provided with a shutter 89 of any desired contour, but conforming to the spherical outer surface of the lamp housing 2, and said shutter is pivoted on the stud 90, having the threaded shank 91 in threaded engagement with the threaded aperture 44, and having the head 92 arranged to retain the shutter 89 in pivoted engagement with the lamp housing 2. Said shutter may be rotated upon the stud 90 to open and close the opening comprising the window, formed by the recesses 55, but is normally retained in its closed position by the tip 93 of the stud 94, which is in threaded engagement with the threaded aperture 44 in the lower shell 40 of the lamp housing 2, said tip being arranged to engage the slotted recesses 95 in the inner face of the lower or free extremity of said shutter 89.

It will be obvious that the window which is covered by the shutter 89 may be opened for various purposes, such, for instance, as the reading of X-ray films, or for any other purpose that may be desired for light that is not in the form of a lensed pencil ray.

The lens tube 3 is formed by the counterpart substantially semicylindrical hollow sections 100, such as is shown in perspective in Fig. 7, which are arranged to be joined by assembling two of such sections with their plane edges abutted, said sections each having a groove 101 along the longitudinal narrow edge of one side thereof, and a ridge 102 along the longitudinal narrow edge of the other side of said section, the groove of one section being arranged to receive the ridge of the other section.

The sections 100 of the lens tube 3 each comprises the annular bead 103 disposed near the inner end thereof, arranged to form the boss 104 and the adjacent shoulder 105, which boss is arranged to be extended through the aperture 46 in the upper section or shell 40 of the lamp housing, and which is provided with radially extended lugs 106, as shown in Fig. 4, which lugs may be registered with the indentations or notches 47, and thrust therethrough, and by the rotation of the lens tube 3, said lugs 106 may be shifted into position behind the margins of the shell 40 encircling the aperture 46, whereby the lens tube may not only be held together with the housing tube, but the counterpart sections of which the lens tube is composed may be also held together.

The boss 104 on the lens-tube sections has a reduced inner termination 109, which is arranged to enter the flange 73 to insure proper registry of the light-reflecting shield with the axis of said lens tube. The substantially semicylindrical bore of the lens-tube sections 100 terminates at its inner end with a semiannular recess 110, having the plane inner wall 111 against which the flat inner side 112 of the lens 113 may engage, the outer curved side 114 of the lens 113 having its margin engaged against the angular wall of said recess 110.

From the plane wall 111 of the recess 110, in the lens-tube sections, the conical wall 115 of the bore converges rearwardly into the restricted orifice 116 concentric with the axis of the lens tube 3 and lamp 30. The outer extremity of the lens-tube sections are reduced to form the threaded nipple 117, and the inner edge of the outer end of the bore of said sections 100 is rabbeted to form the annular groove 119, arranged to receive the peripheral margin of the outer lens 120, which may be held in position by the internally threaded collar 121 which is in threaded engagement with the threads of the nipple 117, and has the flange 122 arranged to engage the outer peripheral edge margin of the lens 120.

The free outer end of the lens tube 3 is arranged to removably receive the daylight attachment comprising the cap 125, having in its cylindrical wall a reduced neck 126 forming a shoulder 127 between which and the inturned flange 128, the daylight screens 129 and 130 are arranged to be engaged. Said cylindrical wall is provided with suitably spaced U-shaped cuts 132 arranged to form the spring tongues 133 having the inwardly pressed projections forming teats 135 which are arranged to enter the annular groove 136 in the collar 121 to yieldingly and removably retain said daylight screen holding cap on said tube in such position that said daylight screens cooperate with the lenses 113 and 120 to project a daylight pencil ray.

It may be here noted that although the counterpart sections of the lens tube are firmly held together by their engagement with the lamp-housing section 40 and by the collar 121, said sections may be conveniently cemented together, and the lens tube may be also cemented to the housing section 40 to afford an integral structure.

My invention is advantageous in that it not only provides the lamp housing of a light projector with a shield for the deflection of the heat generated from the lamp within said lamp housing, but the lamp housing, lens tube, and lamp mounting are formed of a non-heat-conducting material so that the exterior of the light-projector structure which is handled by the operator cannot become uncomfortably heated as has been found to be the disadvantage of lamps of this character having a metallic lamp housing.

I do not desire to limit my invention to the precise details of construction and arrangement as herein set forth, as it is obvious that various modifications may be made therein without departing from the essential features of my invention as defined in the appended claims.

Having thus described my invention, I claim:

1. A light projector comprising a lamp housing formed of a non-heat-conducting material comprising separable sections, and having means arranged to support a lamp therein, and a concentrically disposed heat-deflecting and light-reflecting shield within said housing spaced from the walls thereof, and means extended through said sections in engagement with said shield arranged to secure the structure together.

2. A light projector having a lamp housing formed of non-heat-conducting material, and comprising separable parts having overlapping projections, means arranged to support a lamp therein, and a concentrically disposed heat-deflecting and light-reflecting shield within said housing to which said separable parts may be attached to form a composite light projecting structure, and means extended through said projections arranged to secure said separable parts and said shield together.

3. A light projector comprising a lamp housing and lens tube, each comprising counterpart sections separately joined and provided with interengaging and interlocking means whereby said housing and lens tube may be readily joined together.

4. In a light projector, the combination with a base member arranged to support a lamp, of a lamp housing comprising counterpart sections provided with notched apertures and having overlapping projections and corresponding recesses forming guides for effecting registry of said counterpart sections, means arranged to detachably secure said sections together, a lens-carrying tube having lugs arranged to be thrust through one of said notched apertures in said lamp housing and be rotated to engage said lugs behind the margins of said aperture intermediate of the notches.

5. In a light projector, the combination with a base member arranged to support a lamp, of a lamp housing comprising counterpart sections provided with notched apertures and having overlapping projections and corresponding recesses forming guides for effecting registry of said counterpart sections, a lamp shield serving as a reflector to which said sections may be secured, a lens-carrying tube having lugs arranged to be thrust through one of said notched apertures in said lamp housing and be rotated to engage said lugs behind the notched margins of said apertures, said lens tube being formed of counterpart sections having interengaging recesses and projections for maintaining the opposed edges of said lens-tube sections in registry.

6. A light projector comprising a lamp housing and lens tube, each comprising counterpart axially divided sections separately joined and respectively provided with interengaging and interlocking means whereby said housing and lens tube may be readily joined together.

In witness whereof, I have hereunto set my hand this 21st day of May, A. D. 1926.

ROBERT C. ANGELL.